March 23, 1926.
C. B. JOHNSON
FLOAT VALVE
Filed Jan. 31, 1925
1,578,130
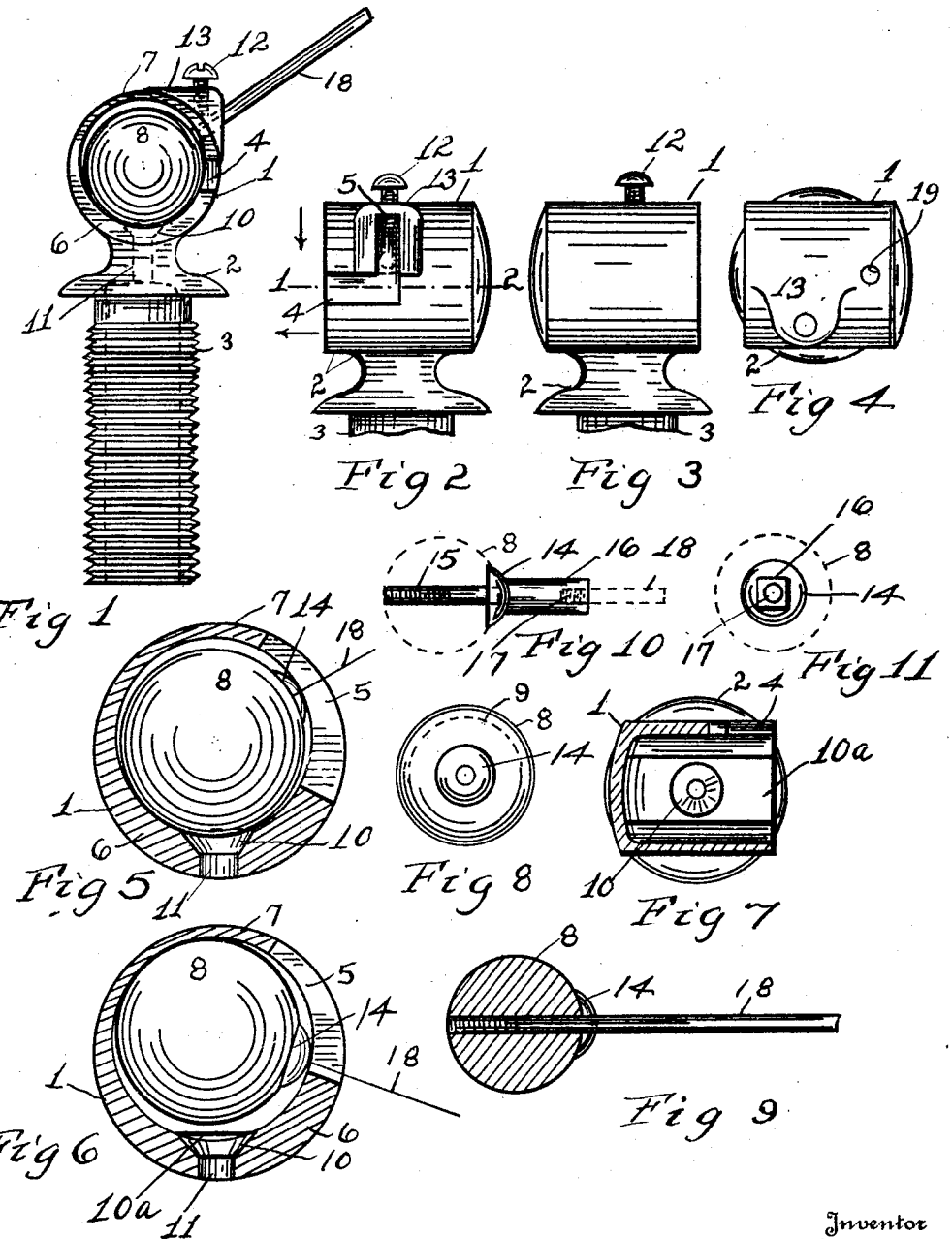
Inventor
Clarence B. Johnson.
By Walter B. Burrow.
Attorney Patented Mar. 23, 1926.

1,578,130

UNITED STATES PATENT OFFICE.

CLARENCE B. JOHNSON, OF NORFOLK, VIRGINIA.

FLOAT VALVE.

Application filed January 31, 1925. Serial No. 6,054.

*To all whom it may concern:*

Be it known that I, CLARENCE B. JOHNSON, a citizen of the United States, residing at Norfolk, in the county of Norfolk and State of Virginia, have invented certain new and useful Improvements in Float Valves, of which the following is a specification.

My invention relates to float valves.

The object of the invention is to provide an efficient, cheap and effective valve means to be operated by the common ball float for toilet flush tanks and other reservoirs.

A further object of the invention is to provide for ease in repacking by changing the relation of the ball valve to its seat by exposing a new surface thereof to the valve seat without taking the ball valve from its enclosing cylinder or bonnet.

Further objects and advantages will be more fully described herein and specifically pointed out in the claims hereinafter annexed, recourse being had to the accompanying drawing forming a part of this specification in which:

Figure 1 is an end view or elevation of my improved float valve.

Figure 2 is a side elevation of the valve bonnet.

Figure 3 is a side elevation of the same in a reverse position.

Figure 4 is a plan of the valve bonnet.

Figures 5 and 6 are enlarged cross sections of the valve bonnets showing two positions of the ball valve.

Figure 7 is a sectional plan of the valve bonnet taken on the line 1—2 in Figure 2.

Figure 8 is an elevation of the ball valve and its washer or bearing ring.

Figure 9 is a sectional view of the ball valve and an elevation of the float rod attached thereto.

Figure 10 is an elevation of a modified form for attachment for the ball valve and its float rod or stem.

Figure 11 is an end view of the same.

In the drawing like reference numerals indicate similar parts in all the several views:—

1 is the bonnet or valve casing having the form of a short cylinder with a closed end formed on the neck 2, the latter being screw-threaded, as shown in Figure 1.

On one side of the bonnet, I provide an L-shaped or angular slot through the wall thereof consisting of the horizontal portion 4 and the vertical part 5 joining each other at right angles to form a continuous L-shaped aperture, as shown in Figure 2.

The vertical part 5 of the L shaped slot is located in line with the water intake 11 which passes through the neck 2 and consequently through the medium of the rod 18, insures the valve 8 a true bearing on its seat.

As shown in Figures 1, 5 and 6, the bonnet or cylinder 1 is provided with a bore made eccentrically or off the axial centre line of the bonnet and consequently has a thick portion or wall and a thin portion 6 and 7, respectively, within which the ball 8 is made to traverse a portion of the inner surface of the bore to enter the seat 10 to shut off the water, the seat being the upper portion of the reduced intake channel through which the water passes from the pipe or threaded portion 3 supplied with the usual piping.

By traversing another portion of the bore, the ball valve 8 will leave the seat 10 and allow the water, of any pressure to enter the tank by the intake 11.

The eccentric movement of the ball, necessary to cause the same to open and close the outlet, is effected by the dished or concaved washer or projection 14 which by its bearing on the inner surface of the bore, regulates the path of the ball at all times. The washer also serves the purpose of protecting the face of the ball from the rubbing of the same against the inner surface.

The ball valve seat 10 is made upon a flat portion $10^a$ at the lower portion of the bore and in the direction of the length of the bonnet or cylinder 1 and its object is to allow the ball 8 to seat itself properly without bearing against the inner walls.

12 is an adjusting screw passing through the boss 13 and centrally positioned within the vertical portion 5 of the L shaped slot, as in Figure 2, and also in line with the valve seat 10 and the float rod 18. The screw is for the purpose of adjusting, especially the upward movement of the float rod 18, and for regulating the path of the rod without having to bend the same for any pressure which is frequently done in ordinary practice.

The washer or protuberance 14, in addition to protecting the face of the ball, is for regulating the position of the ball and permitting it to be forced down to keep same central with the outlet 11 by bearing against the surface of the bore of the bonnet.

In Figures 10 and 11, I show a modified form of ball connection in which 15 is a threaded portion adapted to be screwed into the ball 8, and 16 is a square shank having the washer 14 at one end, the square portion is adapted to fit and work between the walls of the vertical portion of the slot, as at 5, in Figure 2.

As the portion 16 has four faces a new face may be presented within the slot in the event that the ball becomes worn at one particular part and new parts presented without repacking or renewing the ball valve 8. This arrangement permits the use of ordinary float rods commonly employed.

17, Figures 10 and 11, indicates a female thread into which one end of the float rod 18 may be screwed, instead of the rod itself, into the ball 8, as shown in Figure 9.

19, Figure 4, is an orifice in the top portion of the bonnet 1 for the insertion of a small pipe known as a "trap refiller" and is for the purpose of filling the siphon or trap when required, which is the usual practice.

The described arrangement also permits the float and ball 8 to be turned around if desired. This is accomplished by lowering the rod until it touches the bottom of the tank and then turning the part 16 around without removing the same from the cylinder 1, or cutting off the water.

My device may be used on any flush tank which may be high or low or operated at any water pressure and will cut off the water with any size float by reason of the eccentricity of the ball valve contact surfaces within the bonnet or cylinder 1, as shown.

In my invention, the movement of the float rod 18 is much less than in those now in use and as will be seen, there are no rods, pins or bolts or any device which may get out of order and render my invention inoperative.

I claim:—

1. In a float valve in combination with a casing having an eccentric bore, a rolling ball valve having a projection thereon adapted to have a movement in said eccentric bore for regulating the supply of water.

2. In a float valve in combination with a casing having a wall provided with an eccentric bore, a ball valve having a protuberance thereon and adapted to traverse an eccentric path in said bore for regulating the supply of water by the valve, and adjusting means for limiting the path of said ball valve.

3. In a float valve in combination with a casing provided with an eccentric bore, a ball valve therein having a projection thereon adapted to have an eccentric movement in said bore, float rod means connected to said ball, a square shank on said rod, slot guiding and detaching means on the casing for said square portion, and adjusting means therefor.

4. In a float valve in combination with a casing having an eccentric bore, a ball valve adapted to partly traverse said bore, an L shaped slot in said casing, a square rod attached to the ball and working in said slot, float means for operating said square rod, screw adjusting means therefor, and washer bearing means for a part of the circumference of said ball.

In testimony whereof I have hereunto affixed my signature.

CLARENCE B. JOHNSON.